United States Patent
Ichino

(10) Patent No.: US 8,095,015 B2
(45) Date of Patent: Jan. 10, 2012

(54) OPTICAL TRANSCEIVER WITH REDUCED PEAK POWER CONSUMPTION AND A METHOD TO REDUCE PEAK POWER CONSUMPTION

(75) Inventor: Moriyasu Ichino, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 760 days.

(21) Appl. No.: 12/155,928

(22) Filed: Jun. 11, 2008

(65) Prior Publication Data
US 2008/0310851 A1    Dec. 18, 2008

(30) Foreign Application Priority Data
Jun. 15, 2007  (JP) .................................. 2007-159314

(51) Int. Cl.
*H04B 10/00*    (2006.01)
(52) U.S. Cl. ... 398/135; 398/138; 398/136; 372/29.012; 455/572
(58) Field of Classification Search .................. 398/135, 398/138, 136, 38; 372/29.012, 29.014, 29.015, 372/29.02, 29.021, 38.04, 38.02, 38.1, 34; 455/73, 572
See application file for complete search history.

(56) References Cited

U.S. PATENT DOCUMENTS
2003/0066947 A1*  4/2003  Alwan et al. ................... 250/206
2004/0067060 A1*  4/2004  Aronson et al. ............... 398/135
2006/0263092 A1*  11/2006 Hosking et al. ............... 398/135

FOREIGN PATENT DOCUMENTS
| JP | 60-124715 | 7/1985 |
| JP | 2002-299753 | 10/2002 |
| JP | 2004-266760 | 9/2004 |
| JP | 2006-054316 | 2/2006 |

OTHER PUBLICATIONS
Japanese Office Action issued on Oct. 18, 2011 for Application No. 2007-159314 w/ English language translation.

* cited by examiner

*Primary Examiner* — M. R. Sedighian
(74) *Attorney, Agent, or Firm* — Smith, Gambrell & Russell, LLP

(57) ABSTRACT

A method to reduce a peak power consumption of an optical transceiver including a thermoelectric cooler (TEC) is disclosed. The transceiver includes three power units, one of which powers the temperature control unit including the TEC driver and the TEC, second one of which powers the transmitter unit including an LD and an LD driver, and the last of which powers the receiver unit. Once the transceiver is set in the host system, the transceiver first activates the first and second power units to start up the temperature control unit and the transmitter unit, and subsequently, the transceiver sets up the third power unit after the temperature of the LD is stabilized at a target temperature.

10 Claims, 6 Drawing Sheets

OPTICAL TRANSCEIVER WITH REDUCED PEAK POWER CONSUMPTION AND A METHOD TO REDUCE PEAK POWER CONSUMPTION

BACKGROUND OF THE INVENTION

1. Field of the Invention

The present invention relates to an optical transceiver, in particular, the invention relates to a configuration that reduces the peak power consumption.

2. Related Prior Art

Recent optical transceiver installs a thermo-electric controller (TEC) to control a temperature of a semiconductor laser diode (LD). A Japanese Patent Application published as JP-2006-054316A has disclosed an optical apparatus that provides a plurality of optical modules. When respective modules in the apparatus begins their operation, a larger driving current for the TEC installed in the module flows as the temperature of the LD shows a large different with respect to the target temperature requested from the condition of the apparatus. The prior art above has disclosed an optical apparatus, in which respective modules begin to operate one by one with a substantial delay. Accordingly, the optical apparatus may reduce the peak power consumption.

However, even the method disclosed in the prior art, the power consumption of each module is not decreased yet, so the total power consumption in the optical apparatus still remains in high.

SUMMARY OF THE INVENTION

An aspect of the present invention relates to an optical transceiver, which is hot-pluggable with a host system, includes a temperature unit, transmitter unit, and a receiver unit each powered with first to third power units independently operated to each other, respectively. These three power units are powered with the host system when the transceiver is installed therein, and a feature of the transceiver of the invention is that these three power units have timings different from each other to be activated, or at least one of the power units is delayed its operation from the begging of the operation of the other two power units. Because the power units have different timings to operate, or at least one of power unit is delayed its operation, the peak power consumption of the transceiver may be reduced.

Preferably, the third power unit that powers the receiver unit delays its operation from the other two power units. Further preferably, the third power unit operates after the first power unit stabilizes its current output that powers the temperature control unit. That is, the third power unit preferably begins to operate after the first power unit stabilizes the temperature of the laser diode in the transmitter unit.

Further, the transceiver may include a controller powered with one of the first or the second power unit. This controller may control the third power unit so as to delay the operation thereof from the operation of the other two power units. The first power unit powers the temperature control unit that consumes relatively larger current compared with the transmitter unit and the receiver unit because the first power unit is necessary to stabilize the temperature of the laser diode. While, the third power unit powers the receiver unit that consumes relatively small current. Therefore, by delaying the operation of the third power unit from the first power unit; the peak power consumption of the transceiver may be reduced by the power provided to the receiver unit.

Moreover, the controller of the invention may control the temperature of the laser diode by monitoring a current temperature, comparing it with a target temperature, and sending a command to the third power unit when the controller decides the current temperature becomes the target temperature within a preset range. Thus, in the present transceiver, because the controller delays the operation of the third power unit until the temperature of the LD becomes the target temperature, the peak power consumption at the beginning of the operation of the transceiver may be reduced.

Another aspect of the invention relates to a method to start the operation of the optical transceiver that provides a temperature control unit, a transmitter unit, and a receiver unit each powered with an independent power unit. When the transceiver is installed on the host system and the host system powers these power units simultaneously, the transceiver activates these power units sequentially; or at least one of the power units is delayed its operation from the other two power units.

DESCRIPTION OF PREFERRED EMBODIMENTS

Figure 1:
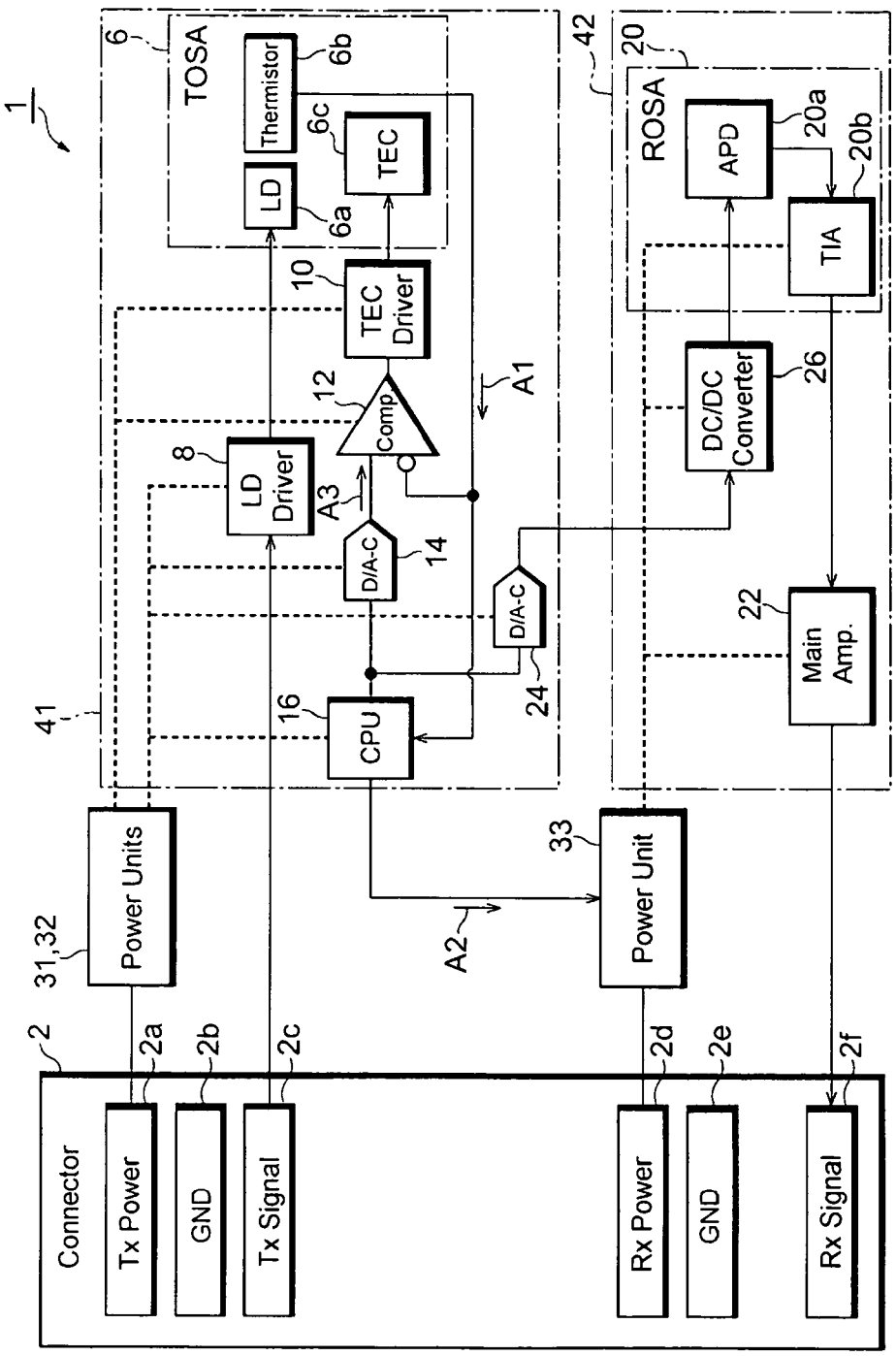
FIG. 1 schematically illustrates a block diagram of an optical transmitter.

Next, preferred embodiments according to the present invention will be described as referring to accompanying drawings. In the drawings, the same numerals or the same symbols will refer to the same elements without overlapping explanations.

FIG. 1 schematically illustrates a block diagram of an optical transceiver 1. This transceiver 1 provides a function of, what is called, the hot-pluggable with respect to the host system, which is not involved in FIG. 1, where the optical transceiver 1 is able to electrically couple with the host system without shutting the host system down. The optical transceiver comprises an electrical connector 2, power unit, 31 to 33, a transmitter unit 41 and a receiver unit 42.

The connector 2 provides terminals, 2a and 2d, to receive the electrical power from the host system, a terminal 2f to output an electrical signal to the host system, a terminal 2c to receive another electrical signal from the host system, and ground terminals, 2b and 2e, for the transmitter unit 41 and the receiver unit 42, respectively. Two power units, 31 and 32, provide the electrical power to the temperature control unit and the transmitter unit 41, while, the last power unit 33 supplies the electrical power to the receiver unit 42.

The first and second power units, 31 and 32, are connected with the Tx power terminal 2a through which the power units, 31 and 32, are powered from the host system. While, the third power unit 33 is connected with the Rx power terminal 2d through which the power unit 33 is powered from the host system. As described later in this specification, the third power unit 43 for the receiver unit delays its operation from the operation of the other two power units, 31 and 32.

The transmitter unit 41 includes a transmitter optical subassembly (TOSA), an LD driver 9, a TEC driver 10, a comparator 12, a digital-to-analogue converted (D/A-C) 14, and a central processing unit (CPU) 16. The TEC driver 10 and the comparator 12, where they constitutes a temperature control unit, are connected with the first power unit 31, while, the LD driver 8, the D/A-C 14 and the CPU 16 are connected with the second power unit 32.

The TOSA 6 may optically couple with an optical fiber to transmit signal light to this optical fiber. The TOSA 6 installs an LD 6a, a thermistor 6b, and a TEC 6c. The thermistor 6b senses a temperature of the LD 6a. The TEC 6c, which is connected with the TEC driver 10, controls the temperature of the LD 6a. The LD driver 8 drives the LD 6a, that is, the LD driver 8 controls an optical emission of the LD 6a by providing the driving current that corresponds to the transmission signal sent from the host system through the signal terminal 2c.

The TEC driver 10, connected with the TEC 6c and the comparator 12, drives the TEC 6c, in other words, controls a temperature of the TEC 6c, depending on a signal sent from the amplifier 16. The comparator 12, connected with the thermistor 6b, the TEC driver 10 and the D/A-C 14, and configured with the differential circuit, compares a signal A1 that indicates a current temperature of the LD 6a output from the thermistor 6b with a reference signal A3 that indicates a target temperature of the LD 6a, which is output from the CPU 12 through the D/A-C 14, and outputs a control signal to the TEC driver 10 so as to set the temperature of the LD 6a to the target temperature within a preset range.

The CPU 16, connected with the D/A-C 14 and the third power unit 33, outputs a command to activate the third power unit 33 after the CPU 16 is powered with the second power unit 32. That is, the CPU 16 advances the procedure shown in FIG. 4 after it is powered with the second power unit 32. The CPU 16 monitors the current temperature of the LD 6a by the signal A1 and decides whether the temperature of the LD 6a becomes the target temperature within the preset range. The CPU 16 sends the signal A2 to the third power unit 33 to power the receiver unit 42 after the CPU decides that the temperature LD 6a becomes stable within the present range around the target temperature. The CPU 16 provides an output port 16a through which the signal A2 is sent to the third power unit 33. This port 16a is held in high-impedance until the initializing procedure of the CPU 16 is completed.

The receiver unit 42 includes a receiver optical sub-assembly (ROSA), a main amplifier 22, another D/A-C 24 and a DC/DC converter 26. The ROSA 26 includes an avalanche photodiode (APD) and a trans-impedance amplifier (TIA) 20b. The main amplifier 22 has a function of a limiting amplifier. The TIA 20b, the main amplifier 22 and the DC/DC converter 26 are powered with the third power unit 33, while, the D/A-C 24 is powered with the second power unit 32.

The ROSA 20 may optically couple with an optical fiber, which is not illustrated in FIG. 1, to receive an optical signal therefrom. The APD 20a, connected with the TIA 20b and the DC/DC converter 26, detects the optical signal by being supplied with a bias from the DC/DC converter 26, a magnitude of which is controlled by the CPU 16 through the D/A converter 24. The APD 20a outputs a photocurrent corresponding to a magnitude of the optical signal to the TIA 20b.

The TIA 20b, connected with the APD 20a and the main amplifier 22, converts this photocurrent into a voltage signal and outputs this voltage signal to the main amplifier 22. The main amplifier 22 amplifies the voltage signal, but the output thereof is limited to a preset voltage. The main amplifier outputs this limited signal to the terminal 2f of the connector 2.

Figure 2:
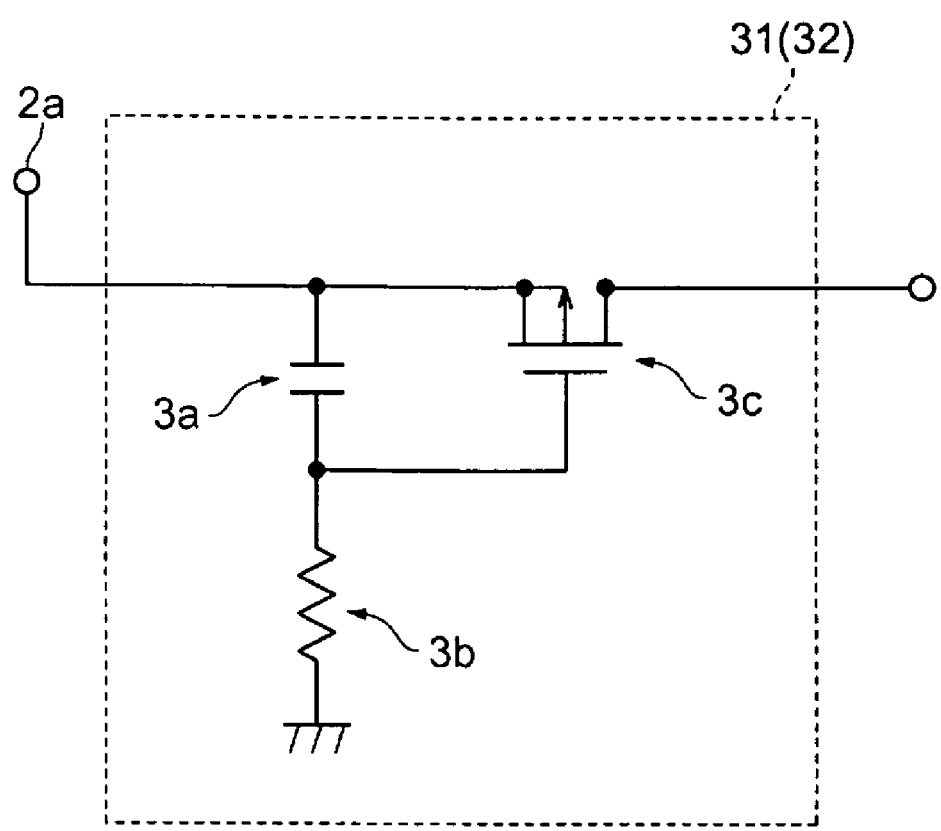
FIG. 2 illustrates a circuit diagram of the first and second power unit.

Next, the first power unit 31 will be described in detail as referring to FIG. 2. The configuration of the second power unit 32 is the same with the first one 31 shown in FIG. 2. This power unit 31 includes a capacitor 3a, a resistor 3b, and a p-type MOSFET 3c. The p-MOSET 3c is connected between the input and the output terminals of the power unit 31, that is, the source terminal of the p-MOSFET is connected to the input terminal that receives the power from the Tx power terminal 2a, while the drain terminal of the p-MOSFET is connected with the output terminal. The capacitor 3a is connected between the input terminal and the gate terminal of the p-MOSFET 3c, while, the resistor 3b is connected between the gate terminal of the p-MOSFET and ground.

When the transceiver 1 is installed in the host system, the first power unit 31 receives a step-like power through the Tx power terminal 2a. The source terminal and the gate terminal of the p-MOSFET follow this step-like power; subsequently, only the gate terminal decreases its voltage level because the gate terminal is coupled with the input terminal through the capacitor 3a. That is, the capacitor 3a and the resistor 3b operate as a differentiator circuit. Following this decrease of the gate level, the p-MOSFET 3c gradually turns on and increases the current flowing from the source to the drain terminals thereof. Thus, even the step-like power is applied, the first power unit 31 may gradually increase the electric power, namely the output current, for the transmitter unit 41, which may effectively suppress the rush current appeared in the transmitter unit 41.

Figure 3:
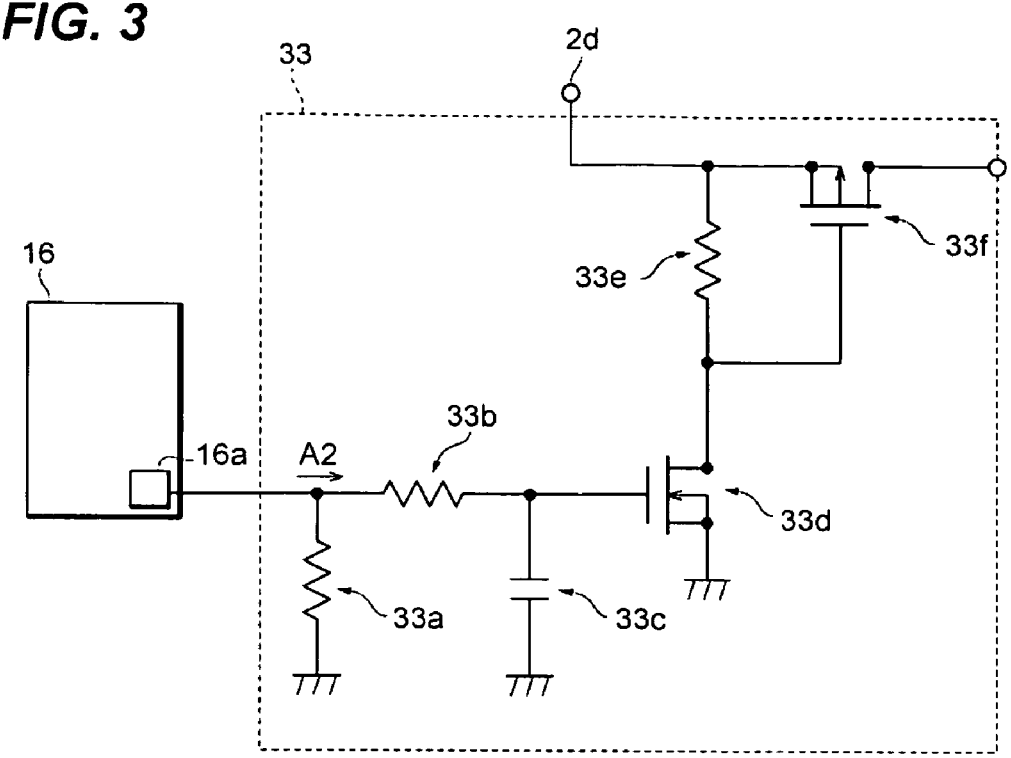
FIG. 3 illustrates a circuit diagram of the third power unit.

Next, the third power unit 33 will be described in detail as referring to FIG. 3. The third power unit 33 includes two resistors, 33a and 33b, a capacitor 33c, an n-type MOSFET 33d, a resistor 33e, and a p-type MOSFET 33f. The p-MOSFET 33f is connected between the input and the output terminals of the power unit 33, while, the n-MOSFET 33d operates as an inverter to amplify the command A2 output from the port 16a of the CPU 16. The p-MOSFET 33f is biased with the Rx power terminal 2d thorough the resistor 33e and drives the n-MOSFET 33f by a thus amplified command. The resistor 33b and the capacitor 33c constitute an integrating circuit to integrate the command A2. The resistor 33a is a pull-down resistor to ground the gate of the n-MOSFET when the output port 16a of the CPU is high-impedance. In this state, the n-MOSFET 33d is turned off and the gate level of the p-MOSFET 33f is pulled up to the power terminal 2d by the resistor 33e, so the p-MOSFET 33f is also turned off.

When the transceiver 1 is set on the host system and the step-like power appears at the Rx power terminal 2d but the initial procedure of the transmitter unit 41 is uncompleted, in which the CPU 16 does not send the command A2 to the third power unit 33 from the port 16a, the gate terminal of the n-MOSFET 33d is pulled down to the ground, while, the gate terminal of the p-MOSFET is pulled up to the Rx power supply. Accordingly, the receiver unit 42 is not powered with the third power unit 33. Completing the initial procedure in the transmitter unit 41 and the CPU enables its output port 16a, whose level becomes the HIGH level; the gate level of the n-MOSFET 33d gradually increases by the integrating circuit of the resistor 33b and the capacitor 33c. Following the increase of the gate level, the current flowing between the drain and source terminals of the n-MOSFET 33d gradually increases, the drain level thereof, which is equivalent to the gate level of the p-MOSFET 33f, gradually decreases by the voltage drop at the resistor 33e. Finally, the p-MOSFET turns on and the third power unit 33 powers the receiver unit 42.

Thus, even when the third power unit 33 is powered through the power terminal 2d of the connector 2, the power unit 33 is held inactive until the third power unit 33 receives the command A2 from the CPU 16. Setting the transceiver 1 on the host system and stabilizing the outputs of the first and the second power unit, 31 and 32, and receiving the command A2 from the CPU 16, the third power unit 33 gradually powers the receiver unit 42.

Figure 4:
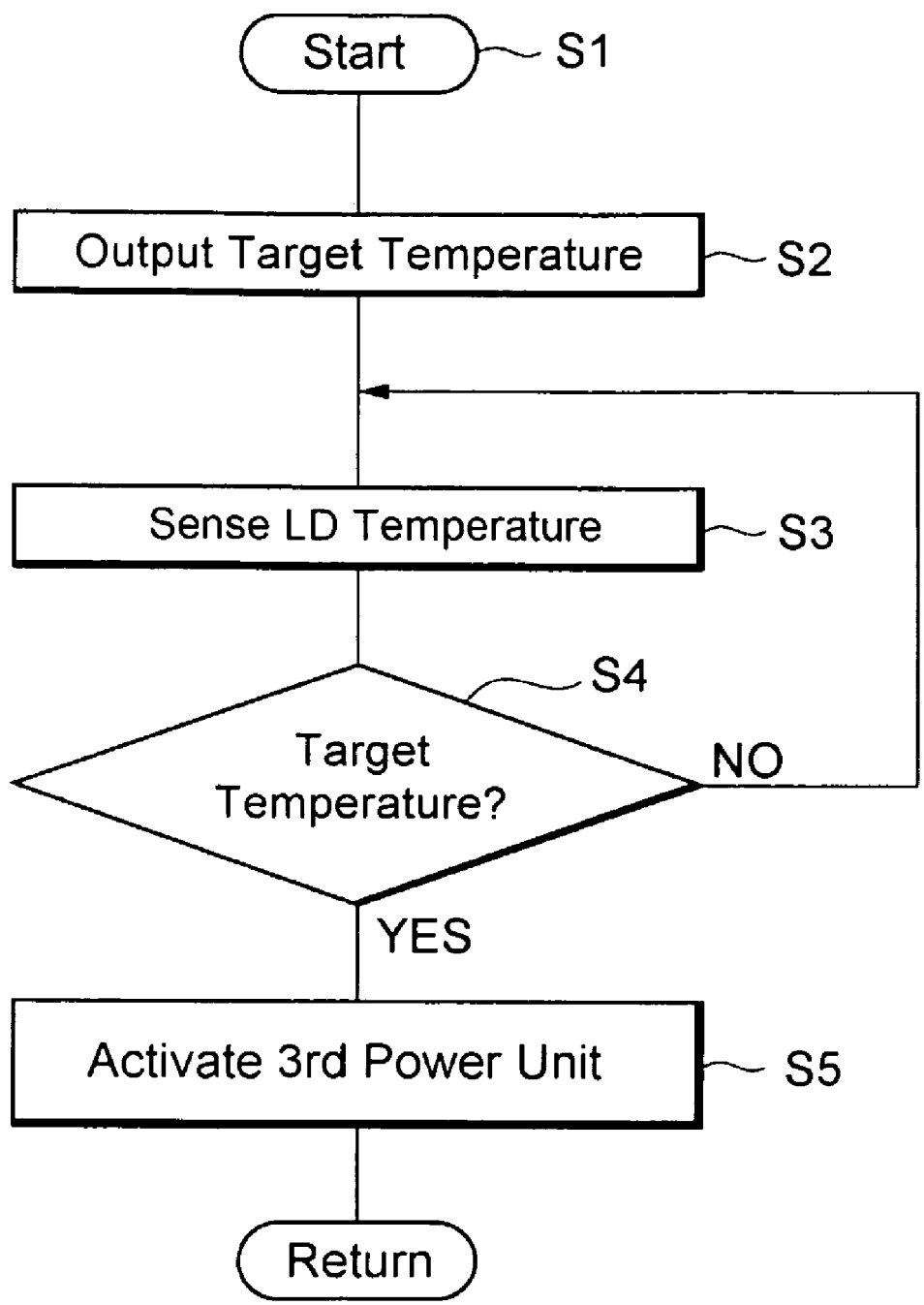
FIG. 4 illustrates a procedure until activating the third power unit.

Next, the initial procedure carried out by the CPU 16 will be described as referring to FIG. 4. The CPU 16, after being powered with the second power unit 32 (step S1), outputs a reference signal A3 to the comparator 12 through the D/A-C 14 at step S2. This reference signal corresponds to the target temperature of the LD 6a. Then, the CPU 16 receives a monitored signal A1 that indicates a current temperature of the LD 6a sensed by the thermistor 6b and compares this monitored signal A1 with the reference signal A3 at step S4. In the case that the CPU 16 judges the current temperature of the LD 6a is within a preset range around the target temperature, the CPU outputs the command A2 to the third power unit 33 to operate it, which is indicated as YES in FIG. 4. The third power unit 33, as described above, activates its output to power the receiver unit 42.

On the other hand, in the case the CPU judges the current temperature of the LD 16a is out of the preset range, the CPU iterates the procedures to receive the current temperature of the LD 6a from the thermistor 6b, step S3, and compares it with the target temperature, step S4, until the current temperature becomes the target temperature within the preset range.

Figure 5:
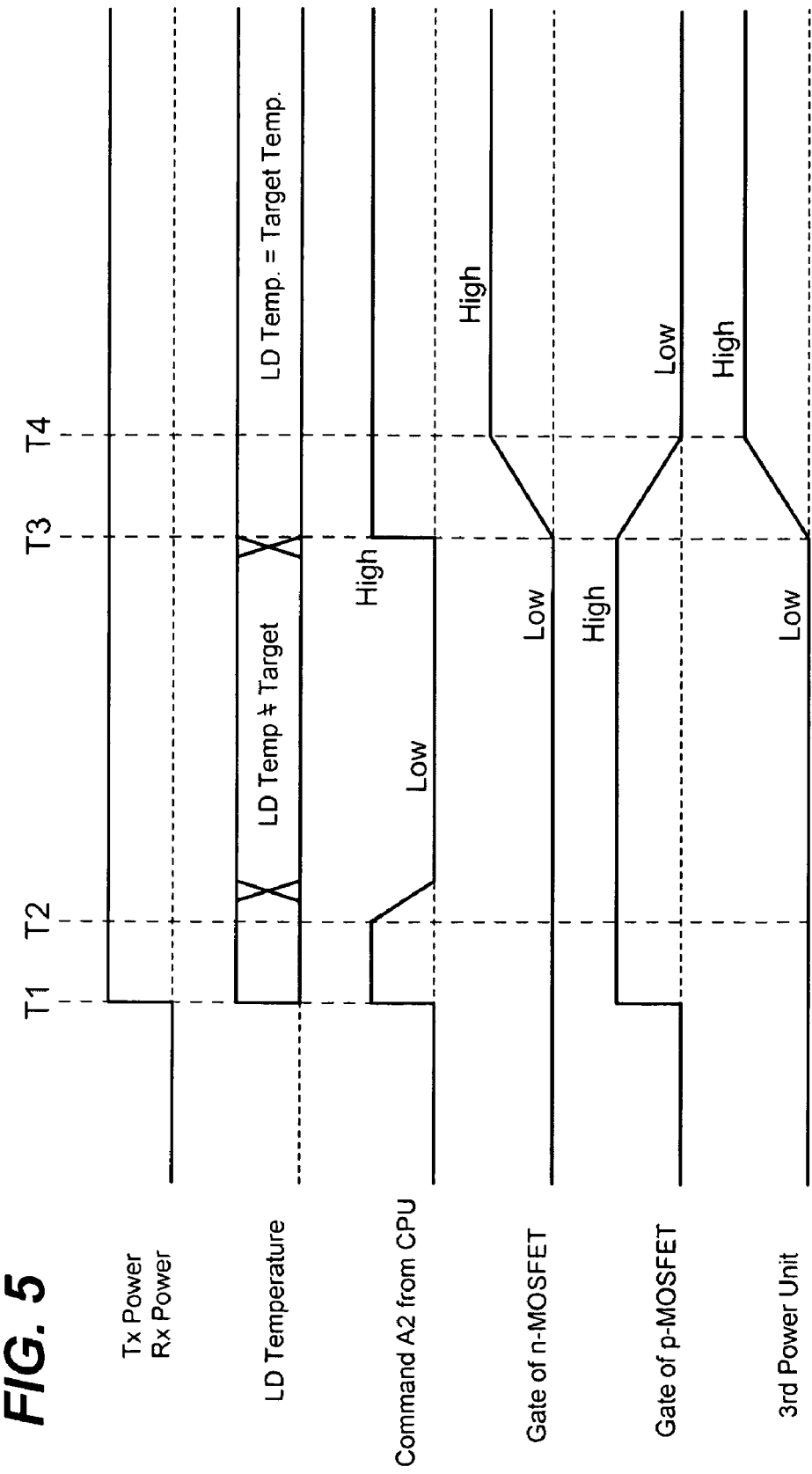
FIG. 5 illustrates a time charts of voltage signals in the transmitter.
Figure 6:
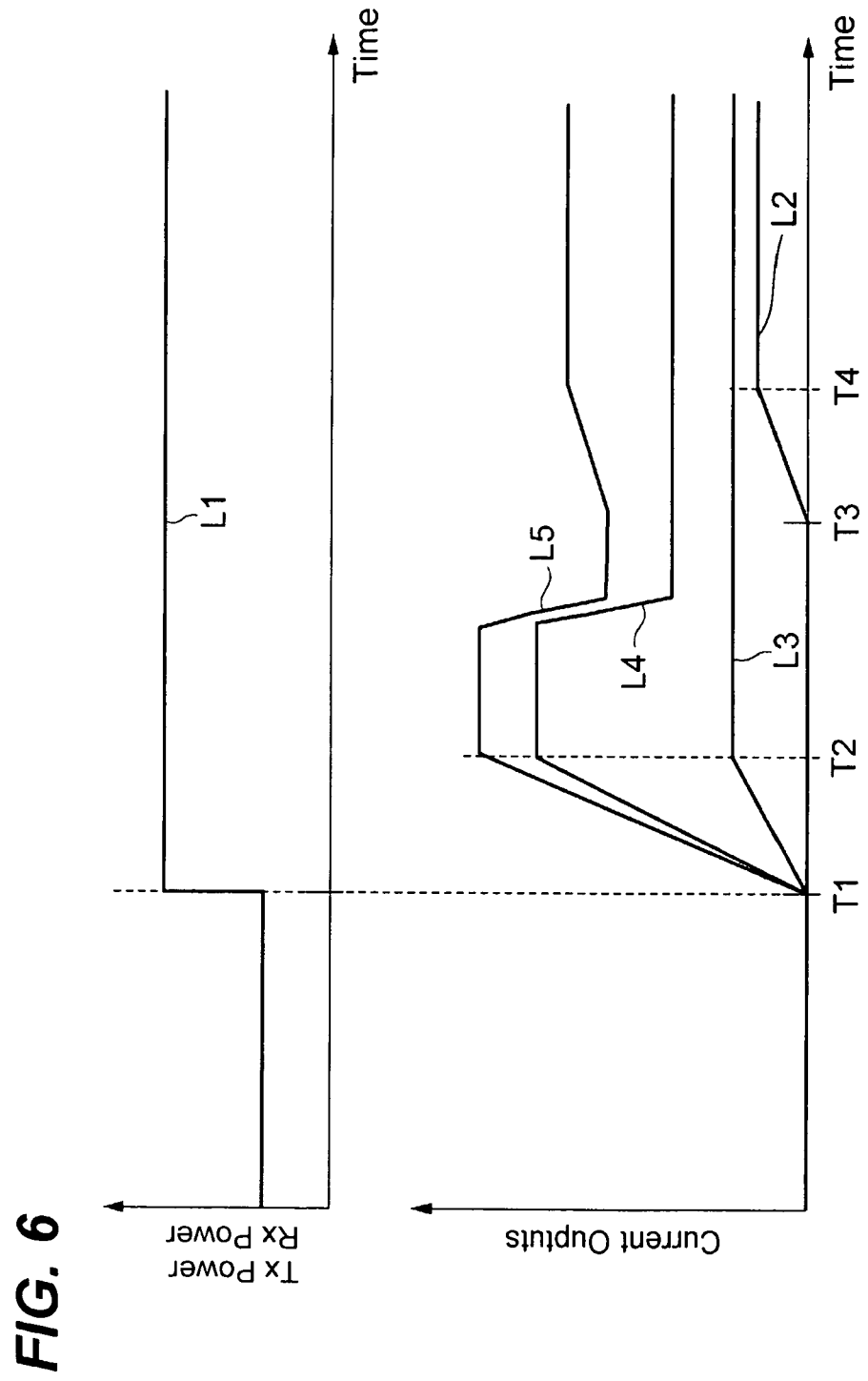
FIG. 6 illustrates a time charts of current signals in the transmitter.

Next, the operation of the transceiver 1 will be described as referring to FIGS. 5 and 6. FIG. 5 is time charts of voltage signals within the transceiver 1, while, FIG. 6 is time charts of current signals. The behavior L1 in FIG. 6 corresponds to the power supplied from the host system through the Tx power terminal 2a and the Rx power terminal 2d in step-like, the behavior L2 denotes the current output from the third power unit 33 to the receiver unit 42, the behavior L3 denotes the current output from the second power unit 32 to the transmitter unit 41, the behavior L4 corresponds to the current output from the first power unit 31 to the temperature control unit in the transmitter unit 41, and the behavior L5 denotes the total current that sums the currents from L2 to L4.

First, at the timing T1 when the transceiver 1 is set on the host system and the power is supplied in step-like to the transceiver 1 through the terminals, 2a and 2d, the output of the third power unit 33 is held zero, because the gate level of the n-MOSFET 33d is set low, while that of the p-MOSFET 33f is set high. On the other hand, the current output from the first and second power units, 31 and 32, which corresponds to the currents indicated by L4 and L3, respectively, gradually increases from the timing T1. As illustrated in FIG. 6, the current L4 output from the first power unit 31 is larger than that from the second power unit 32, because the first power unit 31 supplies the power to the TEC driver 10 and the comparator 12, where these units, 10 and 12, consume relatively larger power until the temperature of the LD 6a becomes the target temperature within the preset range and is stabilized thereat.

At the timing T2, the current L3 output from the second power unit 32 becomes stable, for instance around 80 mA, the CPU 32, which is powered with the second power unit 32, begins its initial routine, but the output port 16a thereof is still held in high-impedance and the gate level of the n-MOSFET 33d is set low even after the timing T2 because the temperature of the LD 6a is not stabilized at the target temperature.

After the timing T2, the temperature of the LD 6a becomes stable around the target temperature, which stabilizes the current output from the first power unit 31 around 130 mA, the CPU 16 sets the output 16a thereof in HIGH level at the timing T3. This output signal from the port 16a corresponds to the command A2. Steps from S1 to S3 in FIG. 4 are carried out after the timing T2, when the CPU 16 begins its normal operation, and step S5 in FIG. 4 is carried out at the timing T3.

The gate level of the n-MOSFET 33d gradually increases responding to the transition of the port 16a from the high impedance to the HIGH level, and the output of the third power unit 33 gradually increases responding to the decrease of the gate level of the p-MOSFET 33d after the timing T3. After the gate level of the n-MOSFET 33d becomes stable in HIGH level and the gate level of the p-MOSFET becomes in LOW level, the output current L2 from the third power unit 33 becomes stable around 60 mA at the timing T4. Thus, the power unit 33 becomes active after the timing T3 and stabilizes its output at the timing T4.

In the present optical transceiver, the timing when the third power unit 33 becomes active is delayed from the timing when the first power unit 31 and the second power unit 32 operate. That is, the third power unit 33 powers the receiver unit 42 after the first and second power units, 31 and 32, power the transmitter unit 41. Specifically, the third unit 33 operates after (1) the first power unit 31 powers the transmitter unit 41 and stabilizes its current around 130 mA and (2) the temperature of the LD 6a becomes the target temperature within the preset range.

In a conventional transceiver, the unit to power the transmitter unit and the other unit to power the receiver unit begin their operation at the same time just after the transceiver is set in the host system. The current supplied to the transceiver shows a peak just after the timing when the transceiver 1 is set in the host system. While, the transceiver according to the present invention, because the CPU 16 delays the operation of the power unit 33 from the operation of the first and second power units, 31 and 32, as shown in FIG. 6, the peak power necessary for the host system when the transceiver 1 is set thereon may be reduced.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An optical transceiver hot-pluggable with a host system, comprising:
    a temperature control unit including a thermo-electric cooler, said temperature control unit being powered with a first power unit;
    a transmitter unit including a laser diode, said temperature control unit controlling a temperature of said laser diode, said transmitter unit being powered with a second power unit; and
    a receiver unit including a photodiode, said receiver unit being powered with a third power unit,
    wherein one of said first to third power units delays an operation thereof from operations of the other two power units.

2. The optical transceiver according to claim 1,
wherein said third power unit delays the operation from the operation of said first and second power units.

3. The optical transceiver according to claim 1,
wherein said first to third power units each has a timing to operate different from each other.

4. The optical transceiver according to claim 3,
wherein said first power unit powers said temperature control unit after said second power unit powers said transmitter unit, and said third power unit powers said receiver unit after said first power unit stabilizes a power thereof supplied to said temperature control unit.

5. The optical transceiver according to claim 4,
wherein said transceiver further comprises a controller powered with said second power unit, and
wherein said controller activates said third power unit after said first power unit stabilizes a temperature of said laser diode.

6. The optical transceiver according to claim 5,
wherein said third power unit includes two transistors and an integrating circuit, one of said transistors being connected between an output and an input of said third power unit, the other of said two transistors driving said one of said two transistors by receiving a command sent from said controller through said integrating circuit,
wherein said other of said two transistors gradually turns on.

7. The optical transceiver according to claim 1,
wherein said first and second power units each includes a transistor connected between an input and an output of said power unit, and a differentiating circuit connected between said input of said power unit and a gate of said transistor, and
wherein said transistor is driven by said input of said power unit through said differentiating circuit so as to be turned off for a moment after said input of said power unit is set.

8. A method to reduce a peak power consumption of a pluggable transceiver comprising a temperature control unit powered with a first power unit, a transmitter unit powered with a second power unit, and a receiver unit powered with a third power unit, said method comprising steps of:
activating said first and second power units when said pluggable transceiver is set in a host system; and
activating said third power unit after said first and second power units stabilize.

9. A method to reduce a peak power consumption of a pluggable transceiver comprising a temperature control unit powered with a first power unit, a transmitter unit powered with a second power unit, and a receiver unit powered with a third power unit, said method comprising steps of:
activating said second power unit when said pluggable transceiver is set in a host system;
activating said first power unit after said second power unit stabilizes; and
activating said third power unit after said first and second power units stabilize.

10. The method according to claim 9,
wherein said transmitter unit further includes a controller powered with said second power unit and said temperature control unit controls a temperature of a laser diode installed in said transmitter unit, and
wherein said controller activates said third power unit after said temperature of said laser diode is stabilized by said first power unit.

* * * * *